April 28, 1970     R. E. S. WALLER     3,508,988

METHOD OF MAKING FIBRILLATED REINFORCED ELASTOMERIC MATERIAL

Filed Aug. 30, 1966

ROY ERNEST SYKES WALLER

INVENTOR

By Rauber & Lazar

HIS ATTORNEYS

United States Patent Office 3,508,988
Patented Apr. 28, 1970

3,508,988
METHOD OF MAKING FIBRILLATED REINFORCED ELASTOMERIC MATERIAL
Roy Ernest Sykes Waller, Sutton Coldfield, England, assignor to The Dunlop Company Limited, London, England, a British company
Filed Aug. 30, 1966, Ser. No. 576,043
Claims priority, application Great Britain, Sept. 8, 1965, 38,446/65
Int. Cl. B29h 17/10, 17/26
U.S. Cl. 156—123   8 Claims

ABSTRACT OF THE DISCLOSURE

A reinforced article such as a pneumatic tyre carcass is manufactured by applying a sheet of orientable fissile material such as a polyamide, or polypropylene, to a sheet of elastomeric material such as natural or synthetic rubber or plasticized chloride. The composite sheet is first supported in the unshaped condition and then shaped and expanded with sufficient orientation in one region to be capable of fibrillation and then after at least partly fibrillating the sheet to provide the finished article with the fibrillated reinforcing layer.

---

Figure 1:
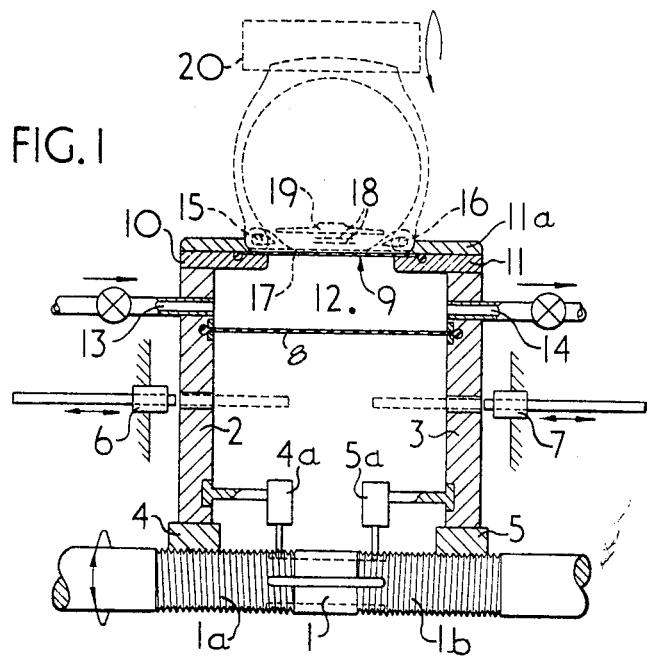

This invention relates to the forming of reinforced articles.

It is known that when synthetic organic linear polymers are stretched in sheet form the material is highly orientated and can be split to form fibrous material, with the fibres aligned in the direction of stretching, by e.g. brushing, rolling, rubbing, twisting, by impact or by other means. Such polymers will be referred to herein as orientatable fissile materials since they are capable of fibrillation.

It is an object of the present invention to provide a novel method and apparatus for forming reinforced articles such as pneumatic tyres, and it is a further object to produce novel articles by the method or apparatus.

According to the invention a method of forming a reinforced article comprises supporting a sheet of orientatable fissile material forming the sheet to expand and shape it, whereby the sheet is subjected to orientation sufficient in one region at least to be capable of fibrillation, and at least partly fibrillating the sheet to provide a fibrillated reinforcing layer.

The method may comprise supporting, forming and fibrillating a composite sheet of elastomeric and orientatable fissile material, the elastomeric material being, for example, natural or synthetic rubber or plasticised polyvinyl chloride, while the orientatable fissile material may be, for example, a polyamide, such as nylon, or polypropylene.

The method may produce, for example, a pneumatic tyre, or a carcass or breaker reinforcement therefor, a reinforced rubber diaphragm, or a shaped nose-portion for a floating flexible fluid-storage container such as those currently used for oil storage.

When the article produced is a pneumatic tyre carcass, the method may comprise supporting the sheet in annular form, at each side, by means of an endless bead wire, the bead wires being disposed in co-axial spaced-apart relationship with the sheet spanning the bead wires. The sheet may be gripped against the rings or bonded, welded or fused thereto. The sheet may then be inflated and expanded into toroidal carcass shape through the intermediary of an internally located expansible resilient rubber diaphragm or tube though this may be dispensed with and direct inflation applied to the sheet. Orientation of the sheet is thus achieved, the degree of orientation depending upon the amount of expansion, differential expansion of the sheet being obtainable by arranging for the diaphragm to be, for example, of greater expansibility in the region intermediate the bead wires than in the bordering regions adjacent thereto.

In the method, the fibrillation may take place towards the end of the expansion or it may be induced by relatively rotating or rotatably oscillating the bead wires or by reciprocating them towards and away from one another or by a combination of rotation, oscillation and movement towards and away from one another. Other means of fibrillation, e.g. by brushing, rolling, twisting, rubbing or impacting the sheet may be used. Alternatively fibrillation may take place in the finally built up tyre when the tyre is expanded into a mould.

The invention also includes the application of unvulcanised rubber to the fibrillated sheet held between the bead wires by e.g. calendering spraying, dipping or pressing.

The fibrillations may extend in a radial direction (90° to the circumferential plane) between bead wires or at an angle thereto by relatively rotating the bead wires. Two or more sheets or layers may be fibrillated and a bias angle structure, opposite in one layer to the other or others may be obtained by stretching to fibrillate one layer at a different relative angular bead relationship to that of another layer or layers.

The method also includes feeding a sheet or layer of orientatable fissile material to form an annulus onto a built tyre carcass in the flat band or partially formed state and adhering it in position and expanding the carcass so as to orientate and fibrillate the sheet to form a breaker layer of circumferential fibrillations. A plurality of sheets or layers may be used.

The sheet or layer of orientatable fissile material may be prestretched before forming, the direction of prestretch relative to the direction of orientation achieved by the expansion or shaping operation predetermining the resultant direction of stretching of the sheet or layer in the finally formed article and thus of fibrillation. A plurality of sheets or layers may be used, the resultant direction of stretching, despite the fact that each sheet is subjected to substantially the same forming operation, being different for at least one sheet or layer, as required.

The method utilised may involve the application of heat during part, at least, of the forming operation, during prestretching or both and, in the case of a pneumatic tyre, the heat may be provided by means of a steam-heated or hot water heated expansible diaphragm or shaping bag.

According to the invention, also, apparatus is provided for manufacturing a reinforced article which comprises means for supporting a sheet of orientatable fissile material and resilient expansible means for expanding the sheet.

Means may be provided for relatively rotating parts of the supporting means and/or for reciprocating them towards or away from one another to induce fibrillation or supplement fibrillation already initiated.

The invention also includes a reinforced article made according to the method and apparatus referred to in the preceding paragraphs incorporating a sheet of fibrillated material.

Figures 2, 3:
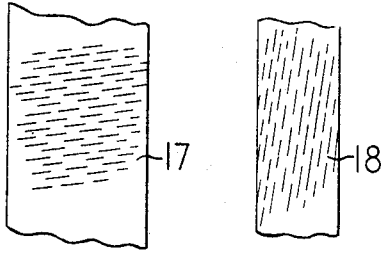

One embodiment of the invention is illustrated in the accompanying drawings in which:

FIGURE 1 is a cross-sectional diagrammatic illustration of apparatus for the manufacture of a pneumatic type tyre reinforced with sheets of fibrillated material in accordance with the invention, FIGURE 2 is a plan view of part of a carcass sheet for the manufacture of a tyre on the apparatus of FIGURE 1 and FIGURE 3 is a plan view of part of a breaker sheet for the manufacture of the said tyre.

The tyre is constructed of polyamide sheet material which can be caused to fibrillate when the stretch in a selected direction parallel to the surface of the sheet reaches about 450 percent of its original length measured in that direction.

Sheets of polyamide (nylon 6) are pre-stretched before application to the apparatus illustrated in FIGURE 1, the direction being shown as regards the sheets for carcass plies, in FIGURE 2, and as regards the sheets for breaker plies, in FIGURE 3, the amount of pre-stretch, which is carried out at ambient temperature, being such that the pre-stretch taken together with the further stretching, to which the sheet is subjected during forming, as can be appreciated from the description which follows, provides a resultant stretch in the required direction in which fibrillation is to take place of substantially 450 percent, i.e. the critical value required to achieve fibrillation. It will be appreciated that a different direction of pre-stretch is required for the carcass plies compared with the direction of pre-stretch for the breaker layers if it is required that the final directions of fibrillation are to be different. In the case of the present embodiment, the direction of final fibrillation of the carcass plies is substantially 90° with respect to the mid-circumferential plane for the carcass ply and 20° with regard to the same plane for the two breaker layers which are applied to the carcass.

When the pre-stretching operation has taken place upon the sheets both for the carcass plies and breaker layers, the sheets are each rubberised on both sides and suitable widths of sheet are cut for application to the apparatus illustrated in FIGURE 1 which will now be described.

The apparatus shown in FIGURE 1 comprises a rotatable cantilever shaft 1, provided with left-hand and right-hand screw-threads 1a and 1b, respectively. An electric motor is provided for reversably driving the shaft 1, the motor not being illustrated. End plates 2 and 3 are provided, respectively, with screw-threaded nuts 4 and 5 which are engageable with the screw-threaded portions 1a and 1b, respectively, of the shaft 1.

Solenoid-operated clamps 4a and 5a are provided attached one to each plate 2 and 3 for non-rotatably clamping the plates to the shaft 1 and preventing rotation of the screw-threaded nuts 4 and 5 upon the screw-threads 1a and 1b upon rotation of the shaft.

A pair of solenoid-operated plungers 6 and 7 are mounted on the machine frame, the plungers being engageable, respectively, with holes in the plates 2 and 3 and slidable therein when the shaft 1 is rotated to cause the screw-threads 1a and 1b and nuts 4 and 5 to move the plates 2 and 3 towards or away from one another for the purpose that will be described later in the specification. An inextensible yet flexible annular diaphragm 8, of reinforced rubber, is fluid-tightly attached to the plates 2 and 3 co-axially with the shaft 1 and a second flexible annular diaphragm 9 is also fluid-tightly attached to the extensions 10 and 11 formed around the outer periphery of the plates 2 and 3 respectively. The diaphragm 9, however, is extensible as well as being flexible. An annular chamber 12 is thus formed between the diaphragms 8 and 9 and the plates 2 and 3, an inlet pipe 13 for hot water or steam being provided in the plate 2 and connected to the chamber and an exhaust pipe 14 being connected to the chamber through the plate 3, inlet and outlet valves being provided, respectively, in the pipes 13 and 14. The extensions 10 and 11 form bead-seating surfaces one for each of a pair of spaced-apart bead wire assemblies from which the tyre, to be manufactured, is made, the bead wire assemblies being illustrated in FIGURE 1 by reference numerals 15 and 16. A securing ring 11a is detachable from the extension 11 for the location of bead wire assemblies and removal of the finished tyre.

A cut width of rubberised polyamide sheet, pre-stretched as described and illustrated in FIGURE 2, of a sufficient length and width to span the extensions 10 and 11 is symmetrically wrapped around the extensions to form a carcass ply 17. Care is taken to arrange the direction of pre-stretch such that the required direction of fibrillation is achieved in the finally-shaped tyre. A pair of bead wire assemblies is located in position one on each extension.

In order to effect the conventional ply turn-over operation the apparatus can be rotated by causing the solenoid-operated clamps 4a and 5a to secure the plates 2 and 3 to the shaft 1, the other solenoid-operated plungers 6 and 7 being dis-engaged from the plates, the electric motor driving the shaft 1, together with the plates 2 and 3, all at the same speed and in the same direction.

A breaker layer 18 of pre-stretched rubberised polyamide sheet material, as illustrated in FIGURE 3, is wrapped circumferentially around the carcass ply 17 lying on the diaphragm 9, the layer 18 being disposed midway between the bead wires, care being taken to arrange the direction of pre-stretch such that the required direction of fibrillation will be achieved in the finally shaped tyre. A second layer 18 is located above the first layer with the direction of pre-stretch disposed in an opposite sense to that in the first layer.

The carcass and breaker is now ready for the application of a length of tread and sidewall rubber 19 which is wrapped around the outer periphery of the breaker.

The assembled tyre is now shaped by supplying the chamber 12 through the pipe 13 with hot water under pressure at a temperature of about 80° C. so that while the diaphragm 8 does not stretch the diaphragm 12, being extensible, will expand by the application of pressurised hot water to the chamber to an amount sufficient to shape a tyre to a toroidal shape of dimensions such as to enable it to be inserted into a mould, at which stage substantially the whole of the carcass ply material from a point adjacent to the ply turn-overs, shown in dotted lines in FIGURE 1, will have been stretched by the pre-stretching and shaping operation by at least substantially 450 percent, sufficient to enable fibrillation to take place in this region; this applies, also, to the breaker layers 18.

Fibrillation can be achieved by engagement of the solenoid plunger 6 with the plate 2 dis-engagement of the solenoid plunger 7 with the plate 3 and dis-engagement with the solenoid-operated clamps 4a and 5a from the shaft 1 and by rotation of the electric motor 1, reversibly, which causes only plate 3 to be reversibly rotated and thus to move the portion of the carcass carrying the bead 16 relative to the portion carrying the bead wire 15, the cyclic reversals inducing fibrillation in the carcass ply 17 and the breaker plies 18.

In an alternative arrangement fibrillation may be caused by rotating the plates 2 and 3 together with the shaft 1, in the manner achieved for ply turn-down utilising a roller 20, shown by dotted lines in FIGURE 1 the profile of the roller, in cross-section, being corrugated so that the roller will deform the periphery of the tyre at spaced intervals during rotation.

The tyre can be removed axially from the apparatus, when the hot water has been exhausted from the chamber 12 through the pipe 14 and the diaphragm 9 returned to its original position, by removal of the loose piece 11a formed on the extension 11 of the plate 3.

It will be appreciated that in the method just described the lengtth of the carcass ply and breaker layers is increased transversely, upon shaping, in addition to being increased circumferentially in length by the increase in diameter of the tyre from cylindrical to toroidal shape. The transverse increase can however be eliminated, or reduced, as required, for example, to affect the final direction of fibrillation, by causing the plates 2 and 3 to move towards one another during the shaping operation. This is achieved by release of the clamping solenoids 4a and 5a from the shaft 1 and sliding engagement of the solenoid plungers 6 and 7 with the plates 2 and 3 respectively and then rotating the shaft 1 in a direction such that the left-hand and right-hand screw-threads 1a and 1b will drive the screws 4 and 5 together, the plates 2 and 3 sliding on the solenoid plungers 6 and 7.

It is an advantage of a tyre according to the invention compared with cord reinforcement tyres that the conventional textile preparation and assembly operations are dispensed with, rubber penetration of the fibrillations is more complete than with cord structure and economy of material is effected on account of the strict orientation of all of the fibres in the direction required.

Moreover fibrillation may be restricted so as not to occur adjacent to the beads where the original sheet form of the reinforcement can be preserved and the unfibrillated sheet can be, where the material is appropriate, bonded, welded or fused integrally with the bead wires.

In addition whereas fibrillated sheets have been described in this specification for use in pneumatic tyres in which the fibrillations extend from one side of the sheet to the other, or substantially so, sheets may be utilised in which the fibrillations are, at spaced intervals, connected together, for example, by welding, adhesion, etc.

Having now described my invention, what I claim is:

1. A method of manufacturing a reinforced article comprising applying to a sheet of orientable fissible material a sheet of elastomeric material to form a composite sheet, supporting at least one composite sheet in the unshaped condition of the said article, shaping the said composite sheet so that the sheet is expanded or otherwise subjected to orientation sufficient in one region at least to be capable of fibrillisation and causing through said expansion or otherwise at least partial fibrillation of the sheet to provide the finished article with the fibrillated reinforcing layer.

2. A method according to claim 1 comprising supporting the sheet of orientatable fissile material in annular form at each side by means of an endless bead wire, the bead wires being disposed in co-axial spaced-apart relationship with the sheet spanning the bead wires.

3. A method according to claim 2 wherein the sheet is inflated into toroidal shape while supported by the bead wires to expand the sheet sufficiently in one region at least to allow subsequent fibrillation.

4. A method according to claim 3 wherein fibrillation is induced by relatively rotating one bead wire with respect to the other subsequent to expansion of the sheet.

5. A method according to claim 4, wherein the sheet is expanded by means of an inflatable member.

6. A method of forming a reinforced article according to claim 5 wherein the sheet is subjected to a degree of pre-stretching short of the degree required for fibrillation, the pre-stretching being in a direction relative to the direction of orientation achieved by the expansion or shaping operation, that the required final direction of orientation and fibrillation is achieved.

7. A method according to claim 6 wherein a plurality of pre-stretched sheets are utilised to form the article, the direction of pre-stretch being different in at least one of the said plurality of sheets.

8. A method according to claim 6 wherein heat is applied to the sheet during part at least of the expansion or shaping operation.

References Cited

UNITED STATES PATENTS

| | | | |
|---|---|---|---|
| 1,289,767 | 12/1918 | Hopkinson | 156—123 |
| 1,526,984 | 2/1925 | Hopkinson | 156—110 |
| 2,411,659 | 11/1946 | Manning | 156—128 X |
| 2,884,044 | 4/1959 | Hulswit et al. | 156—123 X |
| 2,937,684 | 5/1960 | Rockoff | 152—362 |
| 3,142,597 | 7/1964 | Anderson et al. | 156—123 |
| 3,312,584 | 4/1967 | Charlton et al. | 156—110 X |
| 3,396,072 | 8/1968 | Wolfe | 156—128 X |

FOREIGN PATENTS

| | | |
|---|---|---|
| 27,717 | 1911 | Great Britain. |
| 1,407,794 | 6/1965 | France. |

JOHN T. GOOLKASIAN, Primary Examiner

C. B. COSBY, Assistant Examiner

U.S. Cl. X.R.

156—132, 133, 221, 370, 416, 229